US005702557A

United States Patent [19]

Manser et al.

[11] Patent Number: 5,702,557
[45] Date of Patent: Dec. 30, 1997

[54] PROCESS FOR THE PRODUCTION OF AN INFORMATION CARRIER

[75] Inventors: Aloysius Hubertus Manser, Allschwil, Switzerland; Jacques Francois, Huningue, France

[73] Assignee: Ciba Specialty Chemicals Corporation, Tarrytown, N.Y.

[21] Appl. No.: 611,915

[22] Filed: Mar. 6, 1996

Related U.S. Application Data

[62] Division of Ser. No. 783,701, Oct. 23, 1991, Pat. No. 5,525,400, which is a continuation of Ser. No. 521,802, May 10, 1990, abandoned.

[30] Foreign Application Priority Data

May 16, 1989 [CH] Switzerland ............... 1809/89

[51] Int. Cl.⁶ ............... B32B 31/28; B32B 31/12
[52] U.S. Cl. ............... 156/275.7; 156/150; 156/151; 156/275.5; 156/332
[58] Field of Search ............... 156/275.5, 275.7, 156/306.9, 307.3, 150, 151, 332; 283/94, 107, 109, 110, 111; 428/195, 196, 241, 246, 916

[56] References Cited

U.S. PATENT DOCUMENTS

| 3,871,119 | 3/1975 | Mayer. |
| 4,058,401 | 11/1977 | Crivello. |
| 4,097,279 | 6/1978 | Whitehead. |
| 4,100,011 | 7/1978 | Foote ............... 156/308.4 X |
| 4,216,288 | 8/1980 | Crivello. |
| 4,232,079 | 11/1980 | Raphael et al.. |
| 4,389,472 | 6/1983 | Neuhaus et al.. |
| 4,426,466 | 1/1984 | Schwartz. |
| 4,442,172 | 4/1984 | Oshima et al.. |
| 4,455,359 | 6/1984 | Pätzold et al.. |
| 4,497,872 | 2/1985 | Hoppe et al. ............... 283/110 X |
| 4,592,976 | 6/1986 | Whitehead. |
| 4,659,112 | 4/1987 | Reiner et al.. |
| 4,788,102 | 11/1988 | Koning et al.. |
| 4,868,288 | 9/1989 | Meier. |

FOREIGN PATENT DOCUMENTS

| 0189125 | 7/1986 | European Pat. Off.. |
| 0257121 | 3/1988 | European Pat. Off.. |
| 0287516 | 10/1988 | European Pat. Off.. |

OTHER PUBLICATIONS

S. Bernatz et al., Kunststoffe 77, 880 (1987).

Primary Examiner—Melvin C. Mayes
Attorney, Agent, or Firm—David R. Crichton

[57] ABSTRACT

The present invention relates to a process for preparing a laminated structure containing at least a main foil which is substantially impervious to light, B) at least one interlayer, and C) a covering foil which is substantially light-permeable. The layers are bonded together using a UV-curable and/or VIS-curable composition. The interlayer, prior to contact with the curable composition, is substantially impervious to the irradiation necessary for curing the curable composition and becomes transparent when impregnated with the curable composition so as to effect polymerization of multiple layers of curable composition in one irradiation step. The laminated structure is prepared by applying a layer of the curable composition to the main foil A), applying the interlayer B) to the main foil A), applying a further layer of the curable composition to the interlayer B), applying a covering foil C) to the interlayer B), and irradiating the laminated structure so obtained through the covering foil C) with UV- and/or VIS-radiation

15 Claims, No Drawings

PROCESS FOR THE PRODUCTION OF AN INFORMATION CARRIER

This is a DIVISIONAL of Application Ser. No. 07/783,701 filed Oct. 23, 1991, now U.S. Pat. No. 5,525,400, which is a CONTINUATION of Application Ser. No. 07/521,802 filed MAY 10, 1990 now abandoned.

The present invention relates to a laminated structure, to a process for its production, and to the use thereof for registering printed information, for example as identity card (ID card).

ID cards made from plastic foils are known per se. Such cards consist generally of a main foil which is impervious to light and contains the desired information and two transparent covering layers of foil for protecting the main foil. The foils normally consist of a thermoplastic material and are bonded to one another by lamination. Particulars relating to the preparation of the laminates will be found in Kunststioffe 77, 880–1 (1987). Such cards are usually not proof against tampering, as the films can be separated again by heating and thus access obtained to the information recorded on the card.

It has already been proposed to produce ID cards by bonding with photopolymerisable mixtures. Examples of bonded cards made of two transparent plastic foils are disclosed in European patent application 0 287 516.

It has been found that a laminated structure containing a selected interlayer of a material which is substantially impervious to light can be produced by bonding with a UV- and/or VIS-curable composition. The invention is based on the observation that, surprisingly, selected foils which are substantially impervious to light become transparent when they are impregnated with a UV- and/or VIS- curable composition. Such foils which are substantially impervious to light are of particular interest for the production of ID cards, because they can be printed in simple manner prior to the production of the card, preferably by computer-controlled printing methods, for example by ink jet printing. In the practice of this invention, such interlayers are applied with the adhesive and other optional interlayers to a main foil which is substantially impervious to light, optionally provided with further adhesive, covered with a covering foil which is substantially light-permeable, and irradiated through said covering foil so that the adhesive hardens completely between the different foil layers.

The present invention relates to a laminated structure which is bonded with a UV-curable and/or VIS-curable composition and which comprises at least the following layers:

A) a main foil which is substantially impervious to light,

B) at least one interlayer based on a cohesive film or web of woven or non-woven fibrous material or of compacted hollow beads or flakes of a thermoplastic material which carries on the side with its back to the main foil an information in the form of a colour pattern, and C) a covering foil which is substantially light-permeable, with the proviso that the interlayer, prior to contact with the adhesive, is substantially impervious to the irradiation necessary for curing the adhesive.

A further embodiment of the invention relates to a laminated structure which is bonded with a UV-curable and/or VIS-curable composition and which comprises at least the following layers:

A) a main foil which is substantially impervious to light,

B) at least one interlayer based on a thermoplastic material which carries at least on the side having its back to the main foil a layer of finely particulate, substantially insoluble material and which carries an information in the form of a colour pattern on the side with its back to the main foil and, C) a covering foil which is substantially light-permeable, with the proviso that the interlayer, prior to contact with the adhesive, is substantially impervious to the irradiation necessary for curing the adhesive.

Within the context of the description of this invention, the expression "UV-curable and/or VIS-curable composition" will be understood as meaning an adhesive composition which can be cured or activated by radiation in the range from ca. 200–600 nm, preferably from 320–450 nm, of the electromagnetic spectrum. Depending on the type of adhesive, a heat curing can be carried out after activation by UV/VIS irradiation. These methods are known to the person skilled in the art of the radiation curing of adhesives.

Within the context of the description of this invention, the expression "a foil which is substantially impervious to light" will be understood as meaning a foil which, in the range of the wavelength at which the adhesive is cured or activated, has such little transparency that the adhesive is not cured or activated when irradiated through said foil.

Within the context of the description of this invention, the expression "foil which is substantially light-permeable" will be understood as meaning a foil which, in the range of the wavelength at which the adhesive is cured or activated, is so transparent that the adhesive is cured or activated when irradiated through said foil such that, in the subsequent heat treatment step, bonding of the laminated structure takes place.

The main foil A) may consist of any material which is substantially impervious to light within the scope of the above definition. Illustrative examples are foils of metals such as aluminium or copper, of plastics materials such as polyester, especially polyethylene terephthalate, polycarbonate, polyamide, polyolefins, preferably polyethylene or polypropylene, polyacrylonitrile, polymethacrylate, polystyrene, in particular crosslinked polystyrene, polyvinylidene chloride and polyvinyl chloride, or of metal-coated plastics materials, for example those listed above, which are coated by vapour-depositing aluminium or gold thereon. The main foil A) may further contain a pattern, for example in the form of a printed surface.

A particularly preferred main foil A) consists of a thermoplastic material which is optionally coated on the entire surface, or part of the surface, by vapour-depositing a metal thereon. Preferred plastics materials are polyethylene terephthalate or polyvinyl chloride.

The main foil is substantially impervious to light and contains preferably pigments and/or fillers. However, it may also be a non-pigmented thermoplastic material, provided said material is impermeable to light.

A suitable pigment is, for example, titanium dioxide. Examples of fillers are talcum, quartz powder, barites ($BaSO_4$) and metal powders.

The covering foil C) may consist of almost any substantially light-permeable plastics material. Illustrative examples of such materials are cellophane or, preferably, transparent and thermoplastic materials such as saturated polyesters, transparent polyamides, polycarbonates, polyethylene, partially crosslinked polystyrene, polyacrylonitrile, polyvinylidene chloride and polyvinyl chloride.

The covering foil C) consists preferably of polyethylene terephthalate or of polyvinyl chloride.

The cohesive film which constitutes the interlayer B) may consist, for example, of polymer fibres or it may be a foil of skin-like texture such as parchment. The webs are normally made of woven or non-woven textile fibres and/or glass fibres, or they are felt-like materials such as preferably paper.

For the purposes of this invention almost any substrate may be used as interlayer which, in the absence of a UV- and/or VIS-curable adhesive, is not sufficiently transparent to allow complete curing of the composite structure by irradiation.

It is therefore possible to use sized or unsized fine papers. The papers may contain cellulose fibres or other fibres, for example polyethylene fibres, or mixtures of such fibres. In addition to the commonly used felt-like papers, it is also possible to use papers made from polymer flakes.

Preferred interlayer substrates are those which have been specially treated for ink jet printing so as to prevent the ink from running and to ensure that the ink dries rapidly. Illustrative examples of such finishes will be found in Kirk-Othmer, Encyclopedia of Chemical Technology, 3rd Edition, 10, 897 (1980) and 16, 803–825 (1980) or in U.S. Pat. Nos. 4,426,466 and 4,442,172, German Offenlegungsschrift 3 024 205 and European patent application 0 252 884.

It is also possible to use as interlayers substrates which are substantially impervious to light and which have not been specially treated for ink jet printing. These substrates may also be marked by other methods of information recording, for example by relief printing or gravure printing or by screen printing or electrophotography, especially by laser printing.

Preferably the interlayer B) will consist of paper which is suitable for ink jet printing.

In a further embodiment of the invention, the interlayer B) can consist of a thermoplastic foil which has on both sides, or preferably on one side, a layer of finely particulate material which is substantially insoluble in the adhesive. This layer acts as main layer for the colour patterns which constitute the information, or part of the information, contained in the card. The purpose of the layer is to enhance the resolution of the colour patterns, which are preferably applied by ink jet printing and should therefore preferably consist of finely particulate material. This material must be virtually insoluble in the adhesive to be used so that the resolution of the colour pattern is not diminished during bonding owing to the dissolution of the layer components. The layer may consist, for example, of finely particulate material which is impervious to UV and VIS light and absorbs the printing ink such that almost no bleeding of the printed pattern results. Quartz powder is suitable for this purpose. It is preferred to use polysilicic acids having a high specific surface area, for example of 200–800 $m^2/g$ (measured according to the BET method). Such powders are commercially available, for example, under the registered trademark Aerosil® or Syloid®. This layer is strongly light reflecting or light scattering and thus the interlayer, prior to contact with the adhesive, is substantially impervious to the radiation necessary for curing the adhesive. It is assumed that the reflectance or the scattering is diminished by contact with the adhesive so that subsequently sufficient light is able to penetrate the interlayer and thus also able to cure the adhesive beneath.

The colour pattern on the interlayer may be of one or more colours. Size and form of the colour pattern and the nature of the colourants are chosen such that the colourants are substantially light-permeable at the wavelength necessary for curing the adhesive, or that in the areas of the foil B) not covered with colourant a sufficient bonding with the main layer A) is ensured, so that it is not possible to resolve the composite system into its component parts without damaging or destroying individual foils.

As UV-curable and/or VIS-curable composition it is possible to use virtually any adhesive which is curable or can be activated by radiation of this wavelength range. Such adhesive are known per se.

The adhesives may be, for example, epoxy resin adhesives which contain photoinitiators. Suitable photoinitiators for such adhesives are onium salts containing weakly nucleophilic anions, such as sulfonium, sulfoxonium or iodonium salts containing the anions $PF_6^-$, $AsF_6^-$ and $SbF_6^-$, or ($\eta^6$-arene)($\eta^5$-cyclopentadienyl)iron(II) complex salts with the above mentioned anions. Examples of epoxy resins containing such photoinitiators are disclosed in U.S. Pat. Nos. 4,868,288, 4,216,288 and 4,058,401.

In particular, the UV-curable and/or VIS-curable composition is selected from adhesives based on radically polymerisable monomers, preferably based on acrylates and/or methacrylates.

It is preferred to use UV-curable adhesives based on acrylates and/or methacrylates, most preferably adhesives which are curable in the wavelength range of 320–450 nm.

Particularly preferred acrylate-based adhesives contain an oligomeric (meth)acrylate, a monomeric (meth)acrylate and a photoinitiator for said (meth)acrylates, optionally in conjunction with a flexibiliser and/or a sensitiser for the photoinitiator.

The oligomeric (meth)acrylate is preferably an acrylate or a methacrylate of a hydroxyl-terminated polyurethane prepolymer. Particularly preferred adhesives of this type additionally contain a primer, preferably a silane primer, and also a sensitiser for the photoinitiator.

It is especially preferred to use in these adhesives α-aminoacetophenone derivatives as photoinitiators and thioxanthone derivates as photosensitiser. Adhesives of this type are disclosed in European patent application 0 287 516. Examples of monomeric and oligomeric (meth)acrylates and of flexibilisers will be found therein.

The laminated structure of this invention can contain several interlayers of type B) and/or additional light-permeable interlayers, provided that thereby the adhesive in said laminated structure can still be completely radiation cured or can be activated by radiation right through to the main foil. Such additional interlayers may contain information for enhancing proof against tampering, for example in the form of holograms or of surface patterns having a different degree of reflectance.

The laminated structure of this invention can also be made up symmetrically, i.e. an interlayer B) and a covering foil C) can each be applied to both sides of the main foil A), in which case, if desired, further interlayers may be present.

The invention also relates to processes for the production of the above defined laminated structures.

One such process comprises the steps:

a1) applying a layer of a UV-curable and/or VIS-curable composition to the main foil A), a2) applying the interlayer B) to the main foil A), a3) applying a further layer of a UV-curable and/or VIS-curable composition to the interlayer B), a4) applying a covering foil C) to the interlayer B), and a5) irradiating the laminated structure so obtained through the covering foil C) with UV- and/or VIS-radiation of such a wavelength as to effect complete cure of, or at least to activate, the curable composition so that it may be completely cured in a subsequent heat treatment.

A further embodiment of the process of this invention comprises the steps:

b1) coating the interlayer B) on one side and the covering foil C) with a UV- and/or VIS-curable composition, b2) applying interlayer B) to foil A) and then applying foil C) to interlayer B), in each case with the adhesive-coated sides towards foil A), and b3) irradiating the laminated structure so obtained through the covering foil C) with UV- and/or VIS-radiation of such a wavelength as to effect complete cure of, or at least to activate, the curable composition so that it may be completely cured in a subsequent heat treatment.

Yet a further embodiment of the process of this invention comprises the steps:

c1) impregnating the interlayer B) with a UV- and/or VIS-curable composition, c2) inserting said interlayer between the main foil A) and the covering foil C), and c3) irradiating the laminated structure so obtained through the covering foil C) with UV- and/or VIS-radiation of such a wavelength as to effect complete cure of, or at least to activate, the curable composition so that it may be completely cured in a subsequent heat treatment.

These processes can, of course, be so modified that it is possible to produce laminated structures having several interlayers.

The application of the adhesive composition is made in a manner known per se. The layer thickness of the adhesive films will generally be not more than 100 µgm, preferably from 5 to 50 µm. If necessary, however, it is also possible to cure substantially thicker layers by irradiation.

If required, the surfaces to be bonded can be degreased and roughened prior to coating them with the adhesive composition.

After the coated surfaces have been bonded, they are compressed or clamped together and cured by irradiation through the covering foil which is light-permeable in the range of the wavelength for curing the adhesive composition. The laminated structure is preferably cured directly after laminating the different layers, without additional fixation, by simple irradiation with UV- and/or VIS radiation through the covering foil. Depending on the light source, the material to be bonded and the adhesive composition, the cure is normally effected within ca. 0.1 to 30 seconds.

The process can preferably be carried out also partially or entirely continuously.

A great number of different types of light sources may be used for irradiating the adhesive bonds. These light sources are known to the person skilled in the art. For example, mercury vapour lamps or metal halide lamps may be used. By appropriate choice of adhesive, the cure can also be effected by daylight.

The laminated structures of this invention have the broadest possible utility for registering printed information, for example as credit cards, security documents, passports, and identity cards. The invention also relates to the use of the laminated structures for these purposes.

The invention is illustrated by the following Examples. The compositions used in the Examples are prepared by mixing the components together in a dissolver and homogenising the mixture at 50°–60° C. for at most 15 minutes. Parts are by weight, unless otherwise specified.

EXAMPLE 1

The following adhesive composition is prepared:

46 parts of an aliphatic urethane acrylate (EBECRYL® 254, ex UCB), 10 parts of glycidyl methacrylate (SR® 379, ex Sartomer), 40 parts of 1-vinylpyrrolid-2-one, 1.5 parts of benzyldimethyl ketal, 0.5 part of 2-dimethylaminoethylbenzoate (Quantacure® DMB, ex Ward-Blenkinsop), 2 parts of dioctyl phthalate.

A three-layer laminated structure is prepared by applying, with a helical doctor blade, a homogeneous ca. 25 µm thick film of the above adhesive formulation to both sides of an information-carrier foil of a thermoplastic material which contains on one side a microporous, strongly reflecting layer of powdered polysilicic acid. This foil bears on the side with the microporous layer an image applied by ink jet printing. The action of the adhesive causes this layer to undergo an optical change and to become light-permeable. This foil is then rolled on to a ca. 300 µm thick white-pigmented PVC foil. A ca. 100 µm thick transparent PVC foil is then applied blister-free to this combination and covered with a 4 mm thick window-glass plate. This sandwich structure is then cured by irradiation through the transparent PVC foil with a mercury high-pressure lamp of 80 W/cm in a Minicure® tester at a distance of 5–7 cm. Owing to the optical change of the information carrier foil it is then possible to effect the polymerisation of both adhesive layers in only one irradiation step.

EXAMPLE 2

The following adhesive composition is prepared:

25 parts of an aliphatic urethane acrylate (EBECRYL® 254, ex UCB), 35 parts of isobornyl acrylate, 20 parts of 1-vinylpyrrolid-2-one, 20 parts of a vinyl-terminated butadiene/acrylonitrile copolymer (Hycar® VTBNX 1300×23, ex B.F. Goodrich), and 5 parts of a photoinitiator of formula

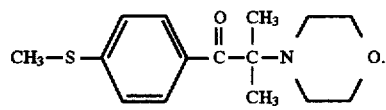

The three-layer laminate is prepared as described in Example 1, except that an ink jet paper (ex Canon) which bears on one side an image applied by ink jet printing is used instead of the information carrier foil. Upon contact with the adhesive composition, this paper too undergoes a change in the reflectance, but does not become clearly transparent. However, the laminate becomes so light-permeable that sufficient UV radiation is able to penetrate the ink jet paper in order to effect complete cure of the adhesive layer underneath.

EXAMPLE 3

The following adhesive composition is prepared:

24 parts of an aliphatic urethane acrylate (EBECRYL® 254, ex UCB), 35 parts of isobornyl acrylate, 20 parts of 1-vinylpyrrolid-2-one, 20 parts of a vinyl-terminated butadiene/acrylonitrile copolymer (Hycar® VTBNX 1300×23, ex B.F. Goodrich), 1 part of γ-glycidoxypmpyltrimethoxysilane (ex Union Carbide), 3 parts of a photoinitiator according to Example 2, 0.2 part of a thioxanthone sensitiser (Quantacure® ITX, ex Ward-Blenkinsop).

The three-layer laminate is prepared by impregnating an information carrier foil supplied by Hewlett-Packard (2 fold paint jet paper No. 51630 P), which bears on one side an image applied by ink jet printing, with the above formulation which is applied by two helical doctor blades which are positioned at a fixed distance from the foil. In this procedure, excess adhesive is removed from both sides of the substrate and a 25 μm film is applied thereto. Further processing is as described in Example 1, using the main foil and covering foil. A bonded three-layer laminated structure is so obtained.

What is claimed is:

1. A process for the preparation of a laminated structure which is bonded with a UV-curable and/or VIS-curable composition and which contains at least the following layers: A) a main foil which is substantially impervious to light, B) at least one interlayer based on a cohesive film or web of woven or non-woven fibrous material or of compacted hollow beads or flakes of a thermoplastic material which carries on the side with its back to the main foil an information in the form of a colour pattern, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polymerization of multiple layers of curable composition in one irradiation step, which comprises the steps:
   a1) applying a layer of a UV-curable and/or VIS-curable composition to the main foil A),
   a2) applying the interlayer B) to the main foil A),
   a3) applying a further layer of a UV-curable and/or VIS-curable composition to the interlayer B),
   a4) applying a covering foil C) to the interlayer B), and
   a5) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

2. A process according to claim 1, wherein the main foil A) consists of a thermoplastic material which is uncoated or is coated on the entire surface, or part of the surface, by vapor-depositing a metal thereon.

3. A process according to claim 2, wherein the thermoplastic material is polyethylene terephthalate or polyvinyl chloride.

4. A process according to claim 1 wherein the covering foil C) consists of polyethylene terephthalate or polyvinyl chloride.

5. A process according to claim 1, wherein the interlayer B) consists of paper which is suitable for ink jet printing or of a thermoplastic material which carries on one side a layer of finely particulate polysilicic acids having a high specific surface area.

6. A process according to claim 1, which comprises the use of a UV-curable adhesive composition based on acrylates and/or methacrylates.

7. A process according to claim 6, wherein the adhesive is curable in the wavelength of 320–450 nm.

8. A process according to claim 6, wherein the adhesive contains an α-aminoacetophenone derivative as photoinitiator and a thixoanthone derivative as photosensitiser.

9. A process according to claim 1, which comprises the use of a UV-curable adhesive composition containing an oligomeric (meth)acrylate, a monomeric (meth)acrylate and a photoinitiator for said (meth)acrylate.

10. A process according to claim 9, wherein the adhesive also contains a flexibiliser and/or a sensitiser for the photoinitiator.

11. A process for the preparation of a laminated structure which is bonded with a UV-curable and/or VIS-curable composition and which contains at least the following layers: A) a main foil which is substantially impervious to light, B) at least one interlayer based on a cohesive film or web of woven or non-woven fibrous material or of compacted hollow beads or flakes of a thermoplastic material which carries on the side with its back to the main foil an information in the form of a colour pattern, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polmerization of multiple layers of curable composition in one irradiation step, which comprises the steps:
   b1) coating the interlayer B) on one side and the covering foil C) with a UV- and/or VIS-curable composition,
   b2) applying the interlayer B) to foil A) and then applying foil C) to interlayer B), in each case with the curable composition-coated sides towards foil A), and
   b3) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

12. A process for the preparation of a laminated structure which is bonded with a UV-curable and/or VIS-curable composition and which contains at least the following layers: A) a main foil which is substantially impervious to light, B) at least one interlayer based on a cohesive film or web of woven or non-woven fibrous material or of compacted hollow beads or flakes of a thermoplastic material which carries on the side with its back to the main foil an information in the form of a colour pattern, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polymerization of multiple layers of curable composition in one irradiation step, which comprises the steps:
   c1) impregnating the interlayer B) with a UV- and/or VIS-curable composition,
   c2) inserting said interlayer between the main foil A) and the covering foil C), and
   c3) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

13. A process for the preparation of a laminated structure which is bonded with a UV-curable and/or VIS-curable composition and which contains at least the following layers: A) a main foil which is substantially impervious to light, B) at least one interlayer based on a thermoplastic material which carries at least on the side having its back to the main foil a layer of finely particulate, substantially insoluble material and which carries an information in the form of a colour pattern on the side with its back to the main foil, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polymerization of multiple layers of curable composition in one irradiation step, which comprises the steps:

a1) applying a layer of a UV-curable and/or VIS-curable composition to the main foil A), a2) applying the interlayer B) to the main foil A), a3) applying a further layer of a UV-curable and/or VIS-curable composition to the interlayer B), a4) applying a covering foil C) to the interlayer B), and a5) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

14. A process for the preparation of a laminated structure which is bonded with a UV-curable and/or VIS-curable composition and which contains at least the following layers: A) a main foil which is substantially impervious to light, B) at least one interlayer based on a thermoplastic material which carries at least on the side having its back to the main foil a layer of finely particulate, substantially insoluble material and which carries an information in the form of a colour pattern on the side with its back to the main foil, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polymerization of multiple layers of curable composition in one irradiation step, which comprises the steps:

b1) coating the interlayer B) on one side and the covering foil C) with a UV- and/or VIS-curable composition, b2) applying the foil B) to foil A) and then applying foil C) to foil B), in each case with the curable composition -coated sides towards foil A), and b3) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

15. A process for the preparation of a laminated structure which is bonded with a UV-curable and/or VIS-curable composition and which contains at least the following layers: A) a main foil which is substantially impervious to light, B) at least one interlayer based on a thermoplastic material which carries at least on the side having its back to the main foil a layer of finely particulate, substantially insoluble material and which carries an information in the form of a colour pattern on the side with its back to the main foil, and C) a covering foil which is substantially light-permeable, with the proviso that the interlayer, prior to contact with the curable composition, is substantially impervious to the irradiation necessary for curing the curable composition and becomes transparent when impregnated with the curable composition so as to effect polymerization of multiple layers of curable composition in one irradiation step, which comprises the steps:

c1) impregnating the interlayer B) with a UV- and/or VIS-curable composition, c2) inserting said interlayer between the main foil A) and the covering foil C), and c3) irradiating the laminated structure so obtained through the covering foil C) with UV- and/or VIS-radiation of such a wavelength as to effect complete cure of the curable composition or at least to activate the curable composition so that it may be completely cured in a subsequent heat treatment.

* * * * *